United States Patent [19]
Vogel

[11] Patent Number: 5,537,823
[45] Date of Patent: Jul. 23, 1996

[54] HIGH EFFICIENCY ENERGY CONVERSION SYSTEM

[76] Inventor: Richard H. Vogel, 228 Fletcher Rd., North Kingstown, R.I. 02852

[21] Appl. No.: 327,046

[22] Filed: Oct. 21, 1994

[51] Int. Cl.⁶ .............................. F02C 1/10; F02G 1/043
[52] U.S. Cl. .................................. 60/682; 60/590
[58] Field of Search ........................... 60/648, 650, 655, 60/682, 517, 590, 593; 62/87, 116

[56] References Cited

U.S. PATENT DOCUMENTS

| | | | |
|---|---|---|---|
| 2,882,687 | 4/1959 | Stivender | 60/650 |
| 3,224,199 | 12/1965 | Best | 60/650 |
| 3,252,286 | 5/1966 | Whitelaw | 60/650 |
| 3,274,781 | 9/1966 | Morain et al. | 60/643 |
| 3,321,930 | 5/1967 | La Fleur | 60/643 |
| 3,797,247 | 3/1974 | Schwartzman | 60/682 |
| 3,841,100 | 10/1974 | Fortescue et al. | 60/690 |
| 4,037,413 | 7/1977 | Heller et al. | 60/655 |
| 5,095,707 | 3/1992 | Eck | 60/650 |
| 5,131,231 | 7/1992 | Trimble et al. | 60/650 |
| 5,272,878 | 12/1993 | Schlichtig | 60/655 |

OTHER PUBLICATIONS

Excerpt from NASA Technical Memo 8334 of Nov. 1982 by R. E. English (pp. 10–17 with attached FIG. 11).
Article "Solar Stirling Engine", Jun. 1978, Popular Science.

*Primary Examiner*—Leonard E. Heyman
*Attorney, Agent, or Firm*—Schweitzer Cornman & Gross

[57] ABSTRACT

A combined cycle thermodynamic heat flow process for the high efficiency conversion of heat energy into mechanical shaft power is disclosed. This process is particularly useful as a high efficiency energy conversion system for the supply of electrical power (and in appropriate cases thermal services). The high efficiency energy conversion system is also disclosed. A preferred system comprises dual closed Brayton cycle systems, one functioning as a heat engine, the other as a heat pump, with their respective closed working fluid systems being joined at a common indirect heat exchanger. The heat engine preferably is a gas turbine, capable of operating at exceptionally high efficiencies by reason of the ability to reject heat from the expanded turbine working fluid in the common heat exchanger, which is maintained at cryogenic temperatures by the heat pump system. The heat pump system usefully employs gas turbine technology, but is driven by an electric motor deriving its energy from a portion of the output of the heat engine.

11 Claims, 4 Drawing Sheets

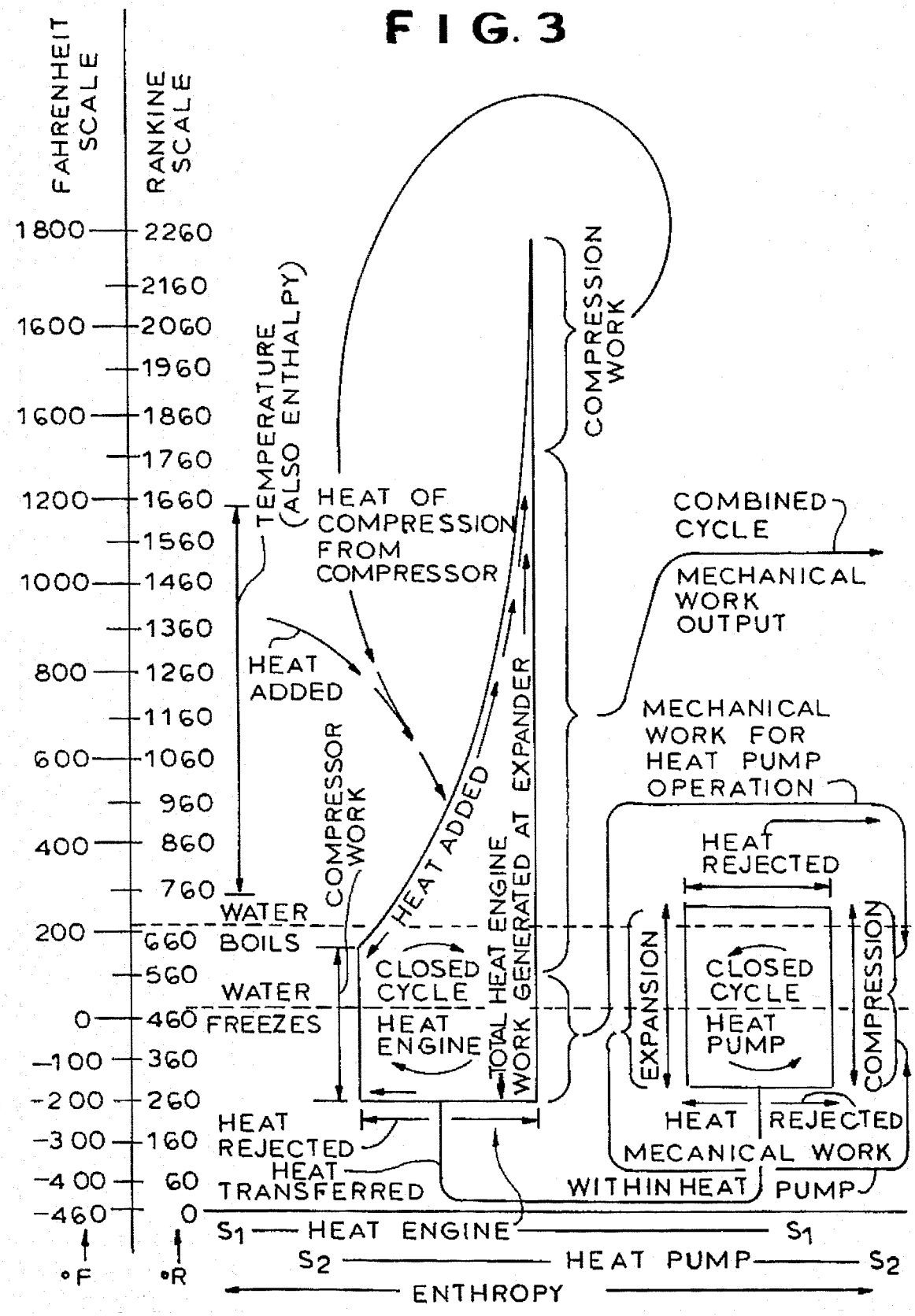

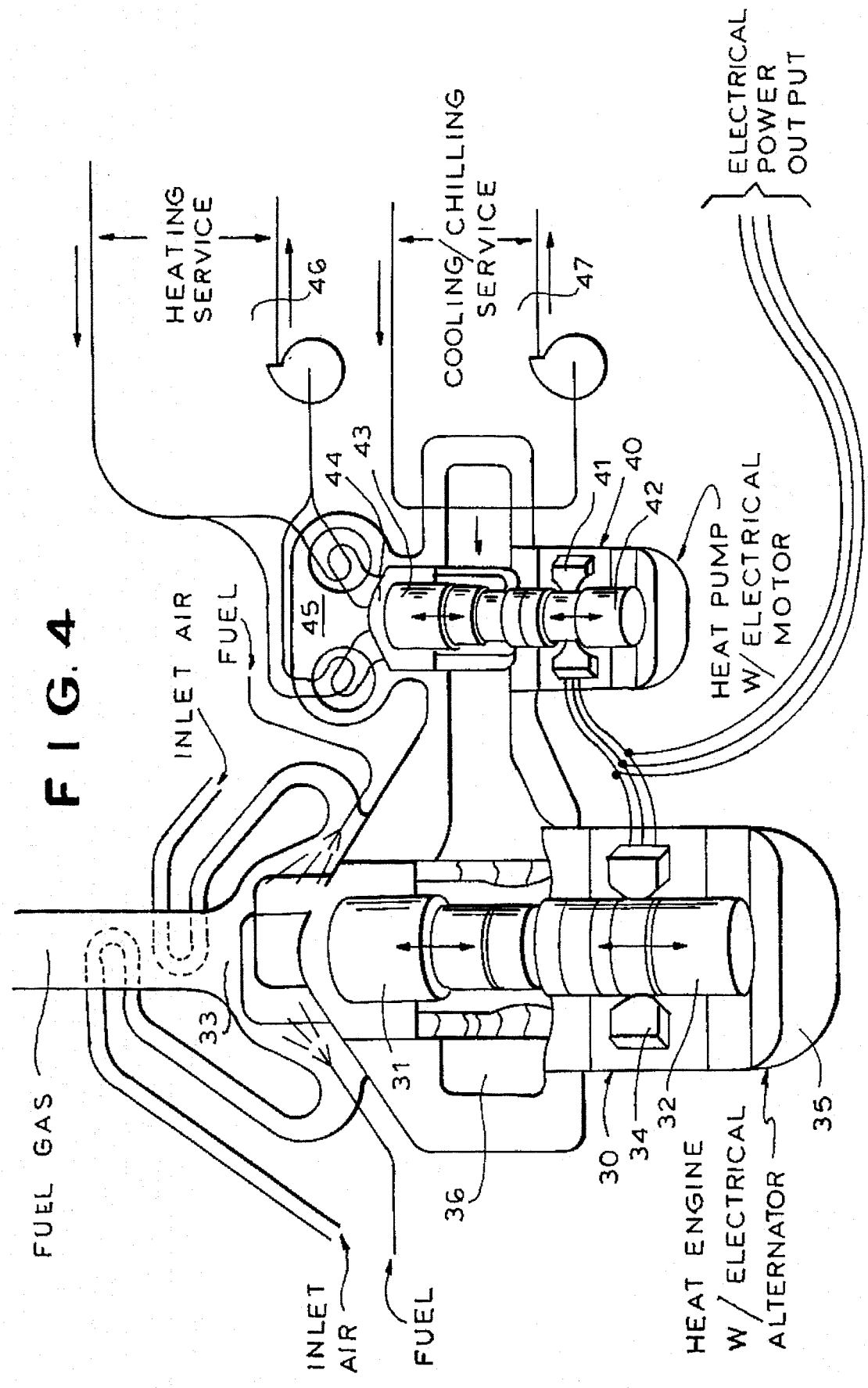

HIGH EFFICIENCY ENERGY CONVERSION SYSTEM

BACKGROUND AND SUMMARY OF THE INVENTION

The present invention is directed to energy conversion, particularly the conversion of heat energy into mechanical power, and particularly into usable electrical power.

The generation of electrical power is, for the most part, accomplished by the conversion of heat into mechanical energy, which in turn is utilized for the generation of usable electrical power. The most widely used systems for this purpose involve the use of fossil fuels in the form of natural gas, fuel oil or coal to generate heat of combustion, which is utilized to create steam for driving turbines. The mechanical output of the turbines is employed to drive electrical generators for the production of electrical energy.

One of the seemingly insurmountable problems inherent in this procedure for electrical power generation is the relatively low conversion efficiencies in terms of energy input versus usable electrical output. Inherent in any process for the conversion of heat energy into mechanical output is that the useful output is a function of the temperature (and therefore the enthalpy) of the fluid medium (be it steam or other fluid) at the inlet of the conversion apparatus, minus the temperature of the fluid medium at the outlet side of the conversion apparatus. Efficiencies generally can be optimized by increasing the inlet temperature of the working fluid and/or by decreasing the outlet temperature of the fluid. Maximum inlet temperatures are, however, limited by the ability of the materials to withstand temperatures and pressures. Likewise, temperatures at the outlet side are limited by practical considerations of being able to reject excess heat to the ambient environment.

As a practical matter, electrical generating plants operating purely on the conversion of fossil fuels to electrical energy via a steam process have achieved maximum efficiencies only in the low 40% range, with well over 50% of the heat energy being wasted by rejection to the environment. The use of gas turbines for power generation enables the conversion process to be operated at a higher temperature range, but still involve very low efficiency rate in the conversion of heat energy to usable electrical output. By combining high temperature gas turbine engines with steam-power generation, to achieve a combined cycle, it is possible to extract some of the waste heat from the gas turbine process and employ it usefully in the steam process, increasing overall thermal efficiencies to about 54% in the modern power plants. Even in these "highly efficient" modern combined cycle power plants, however, almost half of the available energy is lost to the ambient by way of rejected heat.

In accordance with one aspect of the present invention, a novel combined energy conversion process is provided, which enables startling and unexpected improvements to be realized in the thermal efficiency of converting heat energy to usable electric power. By way of the system of the invention, thermal efficiencies approaching 70% can be realized.

In accordance with a further objective of the invention, an energy conversion system according to the invention is readily adaptable to relatively small, low power installations, which are highly compatible with the concept of "energy islanding". In this respect, in the generation of electrical power, the primary outputs are electrical power, on the one hand, and rejected heat, on the other hand. It is a relatively simple technological matter to transmit the electrical power over long distances for distribution to consumers wherever located. However, the rejected heat is usefully employed only to a very limited extent because of difficulties in transmitting it over long distances. Through the use of energy islanding concepts, it is possible to deploy relatively small generating installations in a widely distributed manner, locating them close to consumers of heat energy (or in some cases, chilling service). It is a very simple matter to transmit the electrical power away from the consumers of the heat energy, for utilization wherever the electrical energy may be in demand. The energy conversion system of the invention is uniquely advantageous in this respect, both in the ability to install and operate units of small power capacity, and in the flexibility of deriving either heat energy or chilling service, as may be needed. Pursuant to the invention, an energy conversion system is provided which consist of two closed cycle systems, one functioning as a heat engine, to convert heat energy into electrical energy, and the other functioning as a heat pump, driven by a portion of the output of the first system. The two systems, with closed, circulating working fluids, are joined at a common indirect heat exchanger. The heat exchanger advantageously is maintained at cryogenic temperature levels by the heat pump system and constitutes a virtual heat sink for the rejection of heat from the circulating working fluid of the power-generating heat engine. By virtue of the extremely low heat rejection temperature level of the heat engine, the thermal conversion efficiency of the heat engine is extraordinarily high. Although some of the output of the heat engine is extracted and utilized to drive the heat pump system, the overall efficiency of the combined system is nevertheless significantly greater than obtainable with currently utilized systems.

In one particularly desirable form of the invention, the heat engine system is a gas turbine, operating on a closed Brayton cycle, utilizing argon as a working fluid. The heat pump system likewise is in the nature of a gas turbine unit, but is operated in reverse, in that electrical energy from the generating system is employed to drive the turbine, which is used to compress a closed system circulating fluid, (again preferably argon gas). The compressed gas, after rejection of heat of compression, is expanded at the common indirect heat exchanger, providing cryogenic temperature levels for rejection of waste heat from the heat engine.

The use of gas turbine technology is particularly desirable for the purposes of this invention because it is well understood and equipment is readily available. The basic principles of the invention are, however, not limited to the use of gas turbines operating in a closed Brayton cycle. Stirling cycle engines may also be employed to advantage, one engine to convert heat energy to power output, and a second Stirling engine functioning as a heat pump, driven by a portion of the power output of the heat engine. Hybrid modifications of available vehicular power plants can be economically made to derive economical Stirling cycle systems.

Although in principle the teachings of the invention are applicable to large centralized power stations, they are synergistically useful as applied to smaller power generating installations, geographically distributed in closer proximity to consumers of the otherwise largely wasted thermal output, with excess power being transmitted over conventional power lines to a monitored distribution network.

For a more complete understanding of the above and other features and advantages of the invention, reference should be made to the following detailed description of preferred embodiments of the invention, and to the accompanying drawings.

DESCRIPTION OF THE DRAWINGS

FIG. 3 describes a thermodynamic combined closed cycle heat flow process which is implemented via a closed cycle heat engine, a closed cycle heat pump and appropriate apparatus to (1) add heat to the working fluid of the heat engine from a heat source, (2) transfer rejected heat of the heat engine to the heat pump in the cryogenic temperature range, (3) remove heat from the heat pump to the ambient, (4) extract a small portion of the heat engine output to provide power to operate the heat pump, by mechanical or electrical means, and (5) provide mechanical power at very high thermal efficiency from the combined closed cycle arrangement.

FIG. 4 is a schematic representation of a dual closed cycle energy conversion system according to the invention employing Stirling Cycle systems.

DESCRIPTION OF DEFERRED EMBODIMENTS

Figure 1:
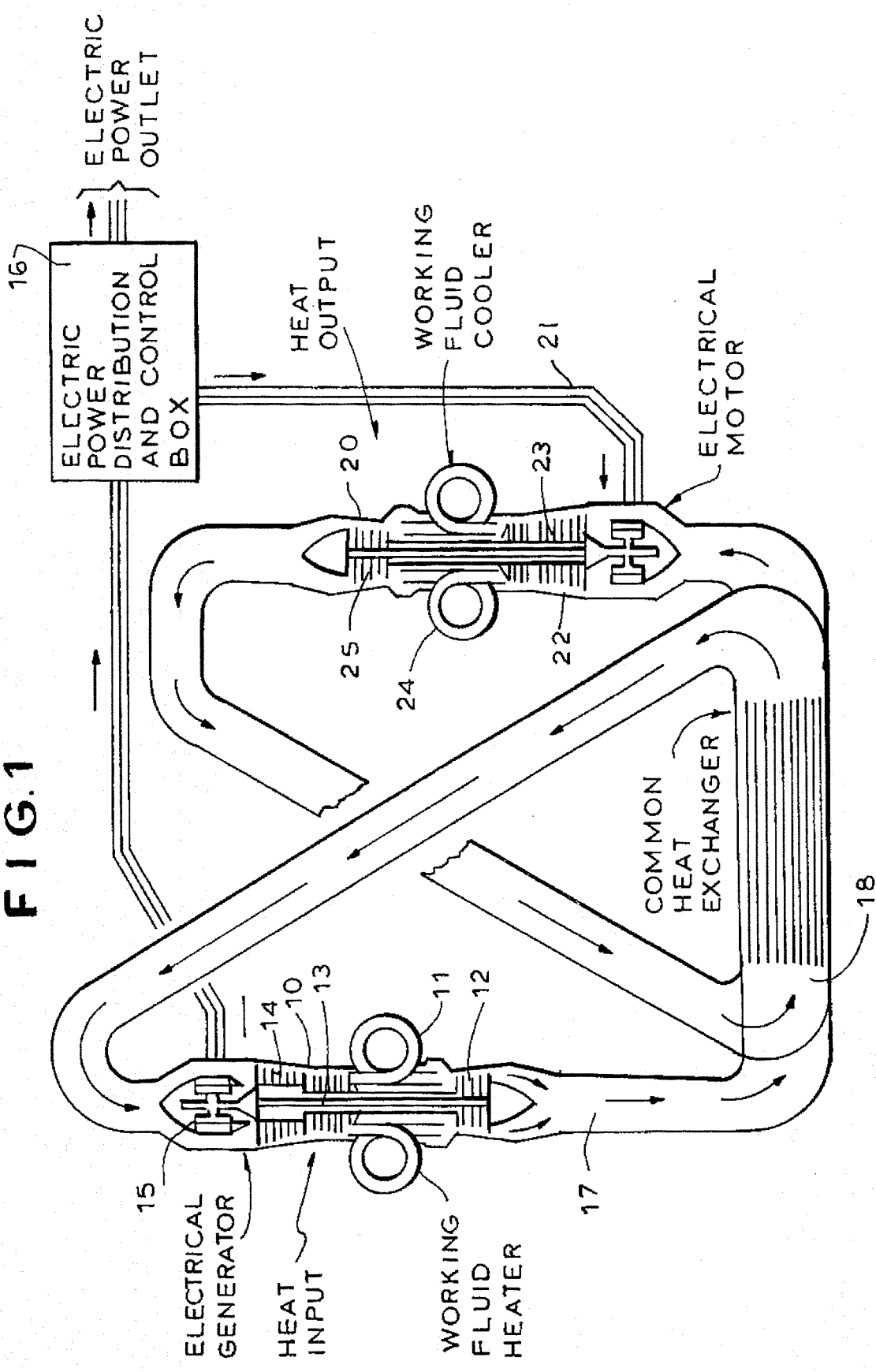
FIG. 1 is a simplified schematic representation of an energy conversion system according to the principles of the invention, employing closed Brayton cycle systems.

The principle objective of the invention is to provide a thermodynamic process employing a combination of closed cycles in which (1) a heat engine can operate between the largest temperature range between a heat source and a heat sink without the customary heat sink limitation of the ambient, (2) a cryogenic temperature range heat sink ("combined cycle cryogenic virtual heat sink") is provided to enhance heat engine thermal efficiency, (3) a heat pump is used to extract heat from the cryogenic range heat sink so that the combined closed cycle can reject heat to the ambient, and where (4) the heat engine and heat pump are interconnected via mechanical or electrical power transmission means. The system of the invention is based upon the principle of extending the working temperature range of a heat engine without resorting to exotic materials and technologies. By thus extending the operating temperature range of otherwise relatively conventional equipment, it becomes possible to realize significant and surprising increases in energy conversion efficiency. In the broadest of sense, the system of the invention employs a heat pump apparatus in conjunction with a heat engine in order to extend the temperature levels, at which heat can be rejected by the heat engine, to very low levels in the cryogenic range. This enables the energy conversion efficiency of the heat engine to be enormously increased. While some portions of the energy output of the heat engine are employed to drive the heat pump system, the net conversion efficiency of the combined system remains substantially greater than that of systems heretofore employed.

In a particularly advantageous embodiment of the invention, a gas turbine 10 is utilized as the heat engine. The gas turbine, the general technology for which is well known and will not be described in any detail herein, is operated on a closed cycle, with its working fluid contained in a sealed circulating system. To advantage, the working fluid can be argon gas.

The gas turbine 10 is operated on the so called closed Brayton cycle. To this end, the working fluid is circulated through a heat exchanger section 11, in which the gas is heated to a high temperature by an external heat source. The external heat source can be natural gas, oil, coal or the like. The particular heat source is not critical to the invention. In a typical gas turbine engine incorporating known technology, a practical upper limit of operating temperature for the heated working fluid is approximately 1750° F. Above that temperature, expensive and exotic materials are required. While the invention does not, in principle, preclude the use of such materials, and the increased upper temperature limits enabled thereby, an important benefit of the invention is that extraordinary improvements in conversion efficiencies may be realized without resorting to such expensive and exotic materials.

After being heated in the heat exchanger 11, the gas is expanded in a turbine section 12, whereby energy of the heated gas is converted to rotary output of a shaft 13. Some of the energy converted at the turbine section is used in a compressor section 14, in which compression blades, driven by the rotating shaft 13 serve to compress the recirculated working fluid, in advance of the heating section 11. The balance of the available energy is employed in a generation of electrical power. To this end, a generator 15 is driven by the rotating shaft 13, and provides electrical power output to a distribution and control system 16.

In the closed Brayton cycle, the expanded working fluid, leaving the outlet of the gas turbine at 17, conventionally is passed through a heat exchanger, reducing the temperature of the outlet gasses to a level somewhat above ambient, typically in range of 200° F. The removal of heat from the outlet gasses is important to the energy conversion efficiency of the system. In this respect, a useful measurement of energy conversion efficiency of a heat engine is $T_{max}$ minus $T_{min}$ divided by $T_{max}$, where $T_{max}$ and $T_{min}$ are temperature values of the working fluid at the respective upper and lower temperature limits. The difference between the values $T_{max}$ and $T_{min}$ represents the energy available to be converted into useful work output and, accordingly, increasing the value of the difference results in a greater useful output and, accordingly, a greater thermal conversion efficiency.

Pursuant to one aspect of the invention, the system of the invention includes an indirect heat exchanger 18, one side of which receives the outlet gasses from the heat engine 10, and the other side of which receives refrigerated gasses from a heat pump unit 20.

The heat pump unit 20 advantageously is based on gas turbine technology operated in a mode to convert electrical energy input to achieve heat extraction from a closed circulating working fluid, advantageously argon. In the system of the invention, some of the electrical power delivered to the distribution and control box 16 is diverted through lines 21 and used to drive an electrical motor 22. The motor 22 drives a gas compressor section 23, which compresses the circulating gas and, in the process of compression, increases its temperature. Desirably, the compression stage 23 achieves a compression of at least about 15:1. In the compression process, the temperature of the circulating working fluid is increased from approximately −200° F. to approximately 100° F. The compressed working fluid is then passed through a cooling section 24 in which heat is rejected to the ambient. The compressed gas is then expanded in the turbine outlet section 25, reducing the temperature of the circulating gas to a level of approximately −200° F.

Figure 2:
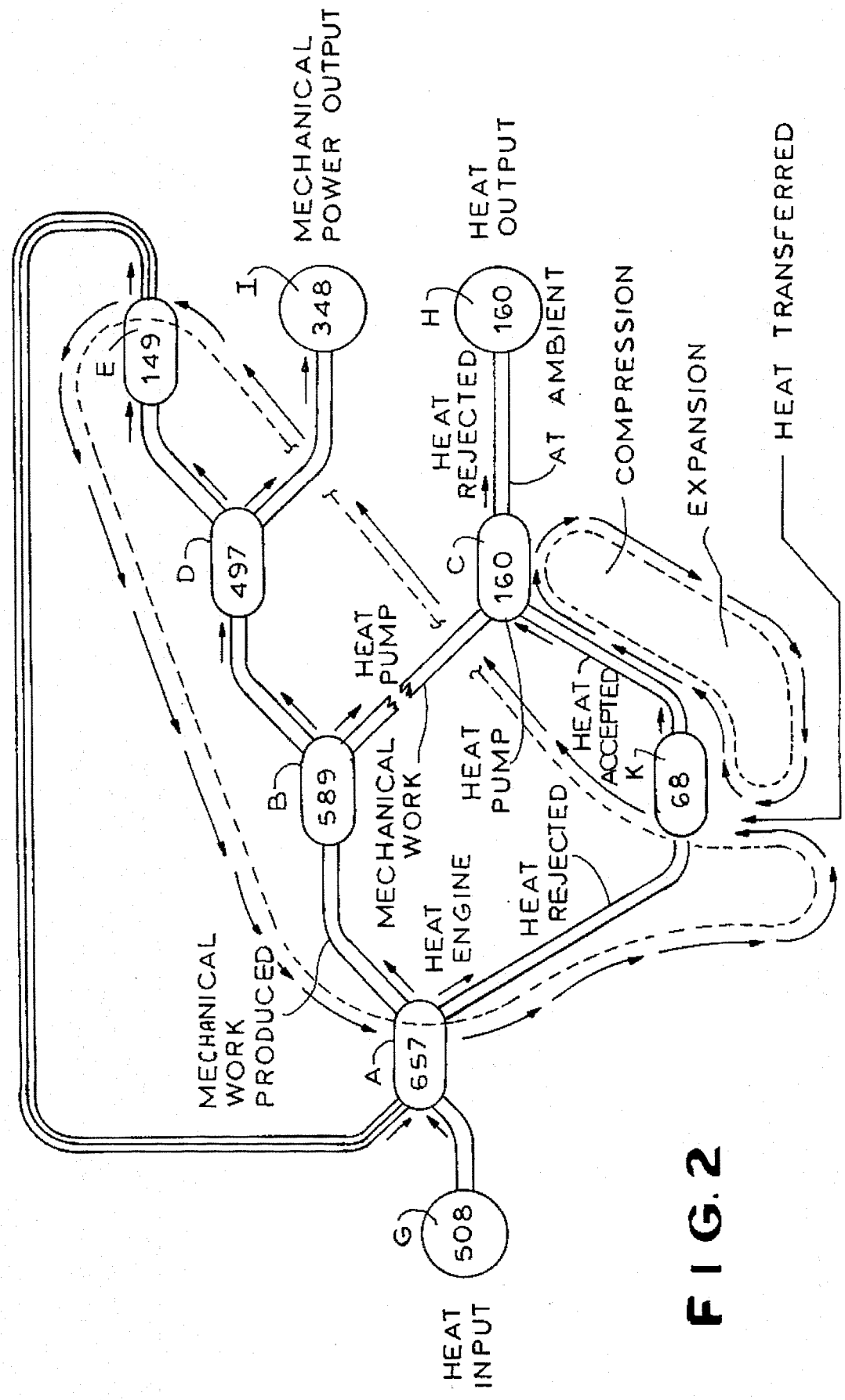
FIG. 2 is a schematic energy flow diagram related to the system of FIG. 1.

With reference to FIG. 2, there is shown a schematic energy flow diagram representative of the system of the invention as reflected in FIG. 1 of the drawings. For purposes of explanation, it is assumed that the enthalpy value of the working fluid at point A in the flow diagram, representing a point immediately prior to entry of the heat engine working fluid into the expander section 12, is at a value of 657. In the expander section 12, an enthalpy equivalent of 589 is converted to work, as reflected at B, and the remainder forms rejected heat, indicated at K, equivalent to an enthalpy of 68.

The rejection of the 68 enthalpy equivalent, indicated that K, is achieved in the cryogenic heat exchanger 18. In order to achieve and maintain cryogenic temperatures in the heat exchanger 18, an enthalpy equivalent of 92 units is required for operation of the heat pump motor 22, and this is derived from the 589 enthalpy units of work available at B in the energy flow diagram. There is thus a combined energy of 160 enthalpy equivalent units indicated at C, comprised of the 68 enthalpy units of rejected heat from the heat engine, and the 92 enthalpy units needed to drive the heat pump. This represents the ultimate rejected heat of the combined system, and constitutes 160 enthalpy equivalent units as reflected at H in FIG. 2.

After extracting the energy needed to drive the heat pump, there are 497 enthalpy equivalent units available at D. Not all of this is available as useful output, however, because energy is required to re-compress the heat engine working fluid in the compressor section 14 of the heat engine turbine 10. For this purpose, 149 enthalpy equivalent units are required, as indicated at E in FIG. 2. The energy required for recompression of the heat engine working fluid is not lost to the ambient, but is converted to heat in the compression process at 14 and forms part of the heat energy input that is utilized by the heat engine at A in FIG. 2. The primary heat input to the heat engine, derived from the combustion of fossil fuels, for example, is indicated at G in FIG. 2 and constitutes 508 enthalpy equivalent units.

The useful energy output of the system of the invention, as reflected in the flow diagram of FIG. 2, is 348 equivalent enthalpy units, as indicated at 1 in FIG. 2. This is achieved with an energy input of 508 enthalpy units, as indicated at G, resulting in an approximate thermal conversion efficiency of 8.5%.

FIG. 3 of the drawings is a so-called T-s diagram reflecting the energy flows of the FIG. 2 diagram. The temperature or enthalpy is shown on a vertical scale and entropy on a horizontal scale. In the illustrated T-s diagram, shown for a dual closed Brayton cycle system, the heat engine is shown to operate at a maximum temperature of about 1750° F., a level at which exotic materials are not required. By utilization of a combined heat exchanger, driven by the heat pump system and forming a cryogenic range virtual heat sink, the heat engine is enabled to reject heat at a temperature level on the order of −200°, far below ambient The closed Brayton cycle heat pump, driven by a portion of the mechanical output of the heat engine, extracts heat from the heat exchanger to maintain cryogenic temperature levels therein, and rejects heat at ambient levels.

In the system shown in FIG. 1, although the primary net output is electrical power service, it is also possible, and even desirable to employ the net rejected heat, shown at H in FIG. 2, for a useful purpose. In addition, it may be possible to usefully employ some portion of the cryogenic heat exchanger 18 to provide external chilling service, although this would result in some loss of efficiency in the overall energy conversion system.

A particularly advantageous aspect of the present invention is that a system, such as reflected in FIG. 1, need not be set up as a centralized power plant facility. Rather, it is highly suitable to being set up as a small generating station, particularly at a location where the net rejected heat may be employed usefully in the immediate locale. The net power output can easily be transmitted to a central distribution facility.

Although a preferred form of the invention makes use of gas turbine technology, because of the easy availability of components and the well developed nature of the technology, the basic principles of the invention may be utilized in a variety of ways. In FIG. 4, for example, the system of the invention employs a pair of Stirling cycle devices, one operated as a heat engine and the other operated as a heat pump, and employing a common heat exchange device to provide a cryogenic level virtual heat sink for the heat engine. In FIG. 4, a heat engine 30 is formed by a free piston Stirling cycle engine, having first and second free pistons 31, 32. The technology of Stirling cycle engines, although somewhat complex to describe, is well known to those skilled in the art and forms no part of the present invention. Accordingly, it will not be described in detail herein. In general, however, heat input to the upper end of the cylinder, by way of a combustion chamber 33, initially displaces the piston 31 downwards, and this in turn displaces the second free piston 32 downward, generating a pulse of electrical power by way of coils 34. The lower piston 32 is "bounced" back upwardly as a result of compressed gasses in the lower end 35 of the engine housing. This in turn urges the upper piston 31 upwardly, which is permitted at this point in the cycle because of the cooling, in the interim, of the heated gasses that originally displaced the upper piston 31.

Rejected heat of the Stirling cycle heat engine 30 is received by a heat exchanger 36 which is associated with a second Stirling cycle unit 40, acting as a heat pump. The construction of the heat pump unit 40 is similar to that of the heat engine 30, although the systems operate in a reverse manner, with the heat pump using energy input to achieve a heat extraction from the heat engine 30. To this end, a portion of the electrical energy output of the coil 34 is employed by a motor coil 41 in the heat pump to drive a lower free piston 42 downward allowing an upper free piston 43 to be urged downward by the pressure of gasses in an upper chamber 44. The expansion of gasses in the upper chamber 44 results in a lowering of the temperature thereof, and such gasses are directed to the common heat exchanger 36, providing a virtual heat sink for the extraction of heat from the heat engine 30. When the lower free piston 42 is driven upward, by an opposite electrical pulse to the motor coil 41, gasses in the upper end of the housing 44 are compressed and directed into a heat exchanger 45 arranged to reject heat to the ambient. The heat rejected by the heat exchanger 45 may, if desired and feasible, be usefully employed as heating service, as indicated at 46 or otherwise are dissipated in the ambient. If chilling service is desired, it may be derived from the common heat exchanger 36, as indicated at 47 in FIG. 4. There would be a reduction in the conversion efficiencies of the heat engine 30, however if some portion of the common heat exchanger 36 were utilized to provide external chilling service.

The system illustrated in FIG. 4, employing free piston Stirling cycle mechanisms, can also be implemented with Stirling cycle apparatus provided with a more conventional crankshaft and rotary output. The basic principle, however, remains the same. Indeed, dual closed Stirling cycle systems according to the invention may be usefully constructed using to a substantial extent hardware employed in automobile engines and on outboard motor engines.

The basic principles of the invention, involving dual closed cycle operation of a heat engine and heat pump combination, are uniquely advantageous from at least two standpoints: First and foremost is the outstandingly and surprisingly high thermal conversion efficiency which is derived from the utilization of a cryogenic level virtual heat sink to receive rejected heat from the heat engine. Notwithstanding that the maintenance of such a cryogenic virtual heat sink requires the utilization of some of the energy output of the heat engine, the improved performance of the heat engine substantially outweighs the energy consumption of the heat pump. Additionally, energy conversion systems according to the present invention are ideally suited for embodiment in small, geographically distributed units, which can be positioned at locations at which thermal outputs may be utilized close at hand. The electrical power output, on the other hand, can easily be transmitted over whatever distance is necessary for distribution wherever needed. This geographically distributed generating capability, referred herein as energy islanding, enables even greater energy efficiencies to be achieved, by facilitating the use of at least some of the otherwise wasted rejected heat as useful thermal energy for various purposes on a local basis.

An additional advantage of the system of the invention resides in the fact that the utilization of closed and sealed fluid systems, which may be pressurized if desired, provides significant advantages in the longevity of the capital equipment employed.

The use of cryogenic temperatures in the heat exchanger, functioning as the virtual heat sink, is simplified by the fact that the cryogenic conditions are internal of the heat exchanger. In the forms of invention herein illustrated, relatively moderate cryogenic levels of around −200° F. are contemplated. It is within the contemplation of the invention, however, that much lower temperatures may be employed where special circumstances indicate.

The system of the invention enables an energy conversion plant to be selected, if desired, primarily in accordance with localized heating and/or cooling requirements, with the electrical power output being transmitted and utilized at a distant location, according to a networking and distribution system.

The most effective, but not limiting application of the invention is in a high efficiency energy conversion system for use in the generation of electrical power (at large power plants), cogeneration installations (small power plants), and hybrid vehicular power plants. Other applications can include shipboard propulsion power plants, railroad locomotive power plants, and similar types of applications for a relatively lightweight high efficiency energy conversion system.

It should thus be understood that the specific forms of the invention herein illustrated and described are intended to be representative only, as changes may be made therein without departing from the clear teachings of the disclosure. Accordingly, reference should be made to the following appended claims in determining the full scope of the invention.

I claim:

1. A high efficiency energy conversion system, which comprises,
   (a) a closed cycle heat engine for converting heat to mechanical/electrical energy,
   (b) said heat engine comprising a first closed and sealed system for movement of a gaseous heat engine working fluid,
   (c) means in said heat engine for compressing said working fluid,
   (d) means associated with said heat engine for heating the compressed working fluid to a elevated temperature,
   (e) means in said heat engine for expanding said working fluid while deriving mechanical energy from the expansion,
   (f) said first closed and sealed system including a first portion of an indirect heat exchanger for rejecting heat from the expanded heat engine working fluid,
   (g) a closed cycle heat pump system including a second closed and sealed system for movement of gaseous heat pump working fluid,
   (h) means for supplying an energy input to said heat pump system,
   (i) means in said heat pump system for utilizing said energy input for compressing said heat pump working fluid and elevating its temperature,
   (j) means in said heat pump system for rejecting heat from the compressed heat pump working fluid,
   (k) means in said heat pump system for expanding said compressed heat pump working fluid, after rejection of heat therefrom, to reduce the temperature thereof,
   (l) said second closed and sealed system including a second portion of said indirect heat exchanger,
   (m) heat from said heat engine working fluid being extracted in said heat exchanger by transfer to said heat pump working fluid,
   (n) said first closed and sealed system including means for directing said heat engine working fluid to flow from said heat exchanger to said means for compressing said working fluid, and
   (o) said second closed and sealed system causing heat pump working fluid to flow from said heat exchanger to said means for compressing said heat pump working fluid.

2. A system according to claim 1, wherein
   (a) said means for supplying an energy input to said heat pump system comprising means for diverting a portion of the energy derived from expansion of working fluid in said heat engine.

3. A system according to claim 2, wherein
   (a) said heat engine comprising a gas turbine engine,
   (b) said heat pump system comprising a turbine type rotary compressor means.

4. A system according to claim 3, wherein
   (a) said working fluids are comprised of argon gas.

5. A system according to claim 1, wherein
   (a) said heat engine and said heat pump system comprise Stirling cycle apparatuses.

6. A system according to claim 1, wherein
   (a) said heat engine is associated with an electrical generator,
   (b) distribution means is provided for receiving and distributing electrical energy from said generator,
   (c) said heat pump system includes an electrically driven motor for driving said system, and
   (d) said electrically driven motor is connected with said distribution means for diverting a portion of the electrical output of said generator for operation of said heat pump system.

7. A system according to claim 1, wherein
   (a) said means for rejecting heat from the compressed heat pump working fluid including a heat utilization system.

8. A system according to claim 1, wherein (a) means are provided for directing an external medium through said heat exchanger to provide chilling service.

9. A high efficiency energy conversion system, which comprises, (a) first and second energy conversion systems, including respective first and second closed fluid systems for the movement of respective gaseous working fluids, (b) said first system comprising a heat engine for converting externally supplied heat to electrical energy by heating and expansion of gaseous working fluid in the first closed fluid system, (c) said second system comprising a heat pump for converting electrical energy to rejectable heat, (d) said first and second closed fluid systems including a common indirect heat exchanger, wherein rejectable heat in expanded working fluid in the first closed fluid system is transferred to expanded working fluid in the second closed circulating system, (e) said second system including a compressor for compressing and increasing the temperature of gaseous working fluid in said second closed fluid system and further including heat exchange means for externally rejecting heat from said compressed gaseous working fluid.

10. A thermodynamic heat flow system which comprises (a) a closed cycle heat engine for converting heat energy to mechanical energy, (b) a closed cycle heat pump for accepting heat at cryogenic range temperatures and rejecting heat at higher temperatures, (c) a cryogenic range heat exchanger, (d) said heat engine being arranged for the rejection of heat to said heat exchanger, (e) said heat pump being arranged to receive heat from said heat exchanger, (f) means for supplying heat energy to said heat engine, and (g) means associated with said heat pump for rejection of heat.

11. A system according to claim 10, wherein (a) said heat exchanger is an indirect heat exchanger having a first portion forming part of the closed cycle of said heat engine and a second portion forming part of the closed cycle of said heat pump, (b) said heat exchanger forming a cryogenic range virtual heat sink for the rejection of heat by said heat engine.

* * * * *